US012716112B2

(12) United States Patent
Nishikawa et al.

(10) Patent No.: US 12,716,112 B2
(45) Date of Patent: Aug. 25, 2026

(54) METHOD FOR RECOVERING VALUABLE SUBSTANCE

(71) Applicant: DOWA ECO-SYSTEM CO., LTD., Tokyo (JP)

(72) Inventors: Chihiro Nishikawa, Tokyo (JP); Yoshihiro Honma, Tokyo (JP); Ryoei Watanabe, Tokyo (JP); Masataka Yamashita, Tokyo (JP)

(73) Assignee: DOWA ECO-SYSTEM CO., LTD., Tokyo (JP)

( * ) Notice: Subject to any disclaimer, the term of this patent is extended or adjusted under 35 U.S.C. 154(b) by 729 days.

(21) Appl. No.: 18/025,490

(22) PCT Filed: Sep. 7, 2021

(86) PCT No.: PCT/JP2021/032876
§ 371 (c)(1),
(2) Date: Mar. 9, 2023

(87) PCT Pub. No.: WO2022/059564
PCT Pub. Date: Mar. 24, 2022

(65) Prior Publication Data

US 2023/0366061 A1 Nov. 16, 2023

(30) Foreign Application Priority Data

Sep. 15, 2020 (JP) ................................ 2020-154518

(51) Int. Cl.
*C22B 15/00* (2006.01)
*C22B 1/24* (2006.01)
(Continued)

(52) U.S. Cl.
CPC ............ *C22B 15/0056* (2013.01); *C22B 1/24* (2013.01); *C22B 7/003* (2013.01); *F27B 9/26* (2013.01); *H01M 10/54* (2013.01)

(58) Field of Classification Search
CPC ........................................................ F27B 9/26
See application file for complete search history.

(56) References Cited

U.S. PATENT DOCUMENTS 1,628,273 A * 5/1927 Richardson .............. F27B 9/26 264/652
7,328,697 B2 2/2008 Turner et al.
(Continued)

FOREIGN PATENT DOCUMENTS

CN 102583310 7/2012
CN 107562231 1/2018
(Continued)

OTHER PUBLICATIONS

Office Action mailed on Jun. 16, 2025 issued with respect to the related U.S. Appl. No. 18/024,825.
(Continued)

*Primary Examiner* — Christopher S Kessler
(74) *Attorney, Agent, or Firm* — Greenblum & Bernstein, P.L.C.

(57) ABSTRACT

A method for recovering a valuable substance is provided. The method includes a thermal treatment step of thermally treating a target containing a valuable substance using a continuous furnace configured to thermally treat the target while moving a target storing unit, in which the target is stored, such that the target storing unit is not contacted by a flame that is for thermal treatment, and a valuable substance recovering step of recovering the valuable substance from a thermally treated product of the target obtained in the thermal treatment step.

10 Claims, 1 Drawing Sheet

(51) Int. Cl.

| | |
|---|---|
| ***C22B 7/00*** | (2006.01) |
| ***F27B 9/26*** | (2006.01) |
| ***H01M 10/54*** | (2006.01) |

(56) References Cited

U.S. PATENT DOCUMENTS

| | | | | |
|---|---|---|---|---|
| 8,157,887 | B2 | 4/2012 | Frame | |
| 11,482,737 | B2 * | 10/2022 | Nishikawa | B03C 1/10 |
| 12,303,912 | B2 * | 5/2025 | Yodose | H01M 10/54 |
| 2006/0246391 | A1 * | 11/2006 | Gaur | F27D 7/06 432/121 |
| 2009/0314134 | A1 | 12/2009 | Iida | |
| 2012/0024111 | A1 * | 2/2012 | Bratina | F27B 9/26 75/401 |
| 2018/0083325 | A1 | 3/2018 | Usui et al. | |
| 2019/0386354 | A1 | 12/2019 | Muraoka et al. | |
| 2020/0136201 | A1 | 4/2020 | Usui et al. | |
| 2023/0318063 | A1 * | 10/2023 | Suganuma | C22B 15/0013 75/10.67 |
| 2023/0323506 | A1 | 10/2023 | Nishikawa et al. | |

FOREIGN PATENT DOCUMENTS

| | | |
|---|---|---|
| JP | H08-217401 | 8/1996 |
| JP | 2010-003512 | 1/2010 |
| JP | 2011-117270 | 6/2011 |
| JP | 2013-64177 | 4/2013 |
| JP | 2015-170480 | 9/2015 |
| JP | 2016-022395 | 2/2016 |
| JP | 2016-207648 | 12/2016 |
| JP | 2016-219402 | 12/2016 |
| JP | 6268130 B2 | 1/2018 |
| JP | 2018-159477 | 10/2018 |
| JP | 2019-034254 | 3/2019 |
| JP | 2019-175546 A | 10/2019 |
| JP | 2020-049459 A | 4/2020 |
| JP | 2020-49460 | 4/2020 |
| JP | 2020-64855 | 4/2020 |
| JP | 7017860 B2 | 2/2022 |
| WO | WO95/031012 A1 | 11/1995 |

OTHER PUBLICATIONS

International Search Report issued in International Patent Application No. PCT/JP2021/032511, dated Nov. 9, 2021, along with an English translation thereof.
Written Opinion of the International Searching Authority for International Patent Application No. PCT/JP2021/032511, dated Nov. 9, 2021, along with an English translation thereof.
Office Action issued in Japanese Counterpart Patent Appl. No. 2021-553828, dated Nov. 16, 2021, along with an English translation thereof.
Office Action issued in Japanese Counterpart Patent Appl. No. 2021-553828, dated Feb. 8, 2022, along with an English translation thereof.
Notice of Reasons for Refusal (Appeal) in Japanese Counterpart Patent Appl. No. 2021-553828 (Appeal No. 2022-6478), dated Jul. 5, 2022, along with an English translation thereof.
Extended European Search Report in corresponding European patent application No. 21866682.4, dated mailed Mar. 28, 2024.
Zhou, et al., "The Current Process for the Recycling of Spent Lithium Ion Batteries," Frontiers in Chemistry, vol. 8, Dec. 3, 2020.
Office Action in counterpart Singapore Application No. 11202301693P, dated Jul. 2, 2025.
Office Action mailed on Sep. 9, 2025 issued with respect to the related U.S. Appl. No. 18/025,485.
Office Action issued in Japan Counterpart Patent Appl. No. 2020-154515, dated Oct. 26, 2021.
Preliminary Report on Patentability issued in International Bureau of WIPO Patent Application No. PCT/JP2021/032875, dated Nov. 2, 2021.
International Search Report issued in International Bureau of WIPO Patent Application No. PCT/JP2021/032875, dated Nov. 2, 2021 with English translation.
Office Action issued in Taiwan Counterpart Patent Appl. No. 110133513, dated Jul. 21, 2022.
Office Action issued in Taiwan Counterpart Patent Appl. No. 110133513, dated Oct. 26, 2022.
Supplementary European Search Report issued in European Patent Application No. 21869250.7, dated Mar. 15, 2024.
Chinese Office Action issued in CN Application No. 202180062238.5 dated Apr. 18, 2024 with translation.
Singapore Office Action issued in Singapore Patent Application No. 11202301809V, dated Jun. 30, 2025.
International Search Report International Patent Application No. PCT/JP2021/032876, dated Oct. 19, 2021, with English translation.
Extended European Search Report in corresponding European patent application No. 21869251.5, mailed on Feb. 12, 2024.
Office Action mailed Apr. 1, 2025 issued with respect to the corresponding Chinese patent application No. 202180062380.X.
Notice of Reasons for Revocation (Opposition) issued in Japanese Counterpart Patent Appl. No. 6965420, dated Jul. 27, 2022, (Opposition No. 2022-700376).
Office Action mailed on Dec. 4, 2025 issued with respect to the related U.S. Appl. No. 18/024,825.
Office Action mailed on Dec. 29, 2025 issued with respect to the related U.S. Appl. No. 18/025,485.
Office Action mailed on Apr. 3, 2026 issued with respect to the related U.S. Appl. No. 18/025,485.
Nave, C. R. Magnetic Properties of Ferromagnetic Materials. HyperPhysics. 8 pages, https://hyperphysics.phy-astr.gsu.edu/hbase/hframe.html (Year: 2017).
Schwartz, Harold. Nickel. ProKon. (Year: 1998).
Australian Stainless Steel Development Association. Stainless Steel and Fire Resistance. Updated May 16, 2023. 7 pages, https://www.assda.asn.au/blog/307-stainless-steel-and-fire-resistance (Year: 2019).

* cited by examiner

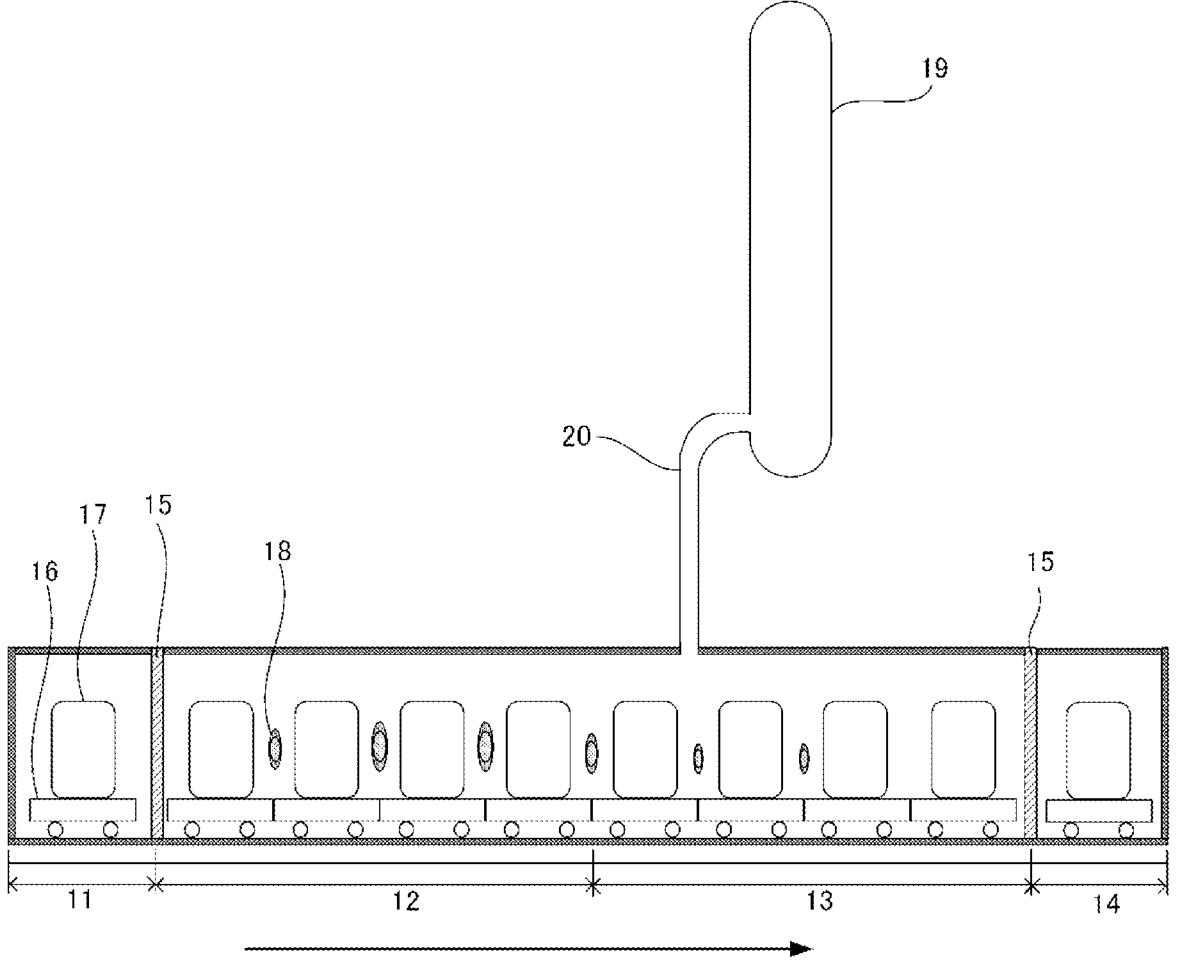
19
20
17
15
16
18
15
11
12
13
14

METHOD FOR RECOVERING VALUABLE SUBSTANCE

TECHNICAL FIELD

The present invention relates to a method for recovering a valuable substance.

BACKGROUND ART

Lithium ion secondary batteries have a lighter weight, a higher capacity, and a higher electromotive force than those of existing lead-acid batteries and NiCd secondary batteries, and are used as secondary batteries of, for example, personal computers, electric vehicles, and portable devices. For example, valuable substances such as cobalt and nickel are used in the positive electrodes of lithium ion secondary batteries in the form of, for example, lithium cobaltate ($LiCoO_2$) and a ternary system positive electrode material ($LiNi_xCo_yMn_zO_2$ (x+y+z=1)).

Lithium ion secondary batteries are expected to continue to become more widespread in use. Therefore, in terms of resource recycling, it is desirable to recover valuable substances such as lithium and copper from defective products generated in the production process or from lithium ion secondary batteries discarded due to, for example, expired life of the batteries and of the devices in which they are used. Here, processes for lithium ion secondary batteries for recovering valuable substances from them may include a thermal treatment for deactivating the lithium ion secondary batteries and rendering them harmless. In order to increase the value of valuable substances to be recovered, it is important to recover the valuable substances without inducing oxidization (embrittlement) of various metals to be contained in thermally treated products to be obtained by thermally treating the lithium ion secondary batteries.

A method for processing lithium ion batteries by heating, which is proposed as a method for thermally treating lithium ion secondary batteries while inhibiting embrittlement of various contained in the lithium ion secondary batteries is as follows. In order to heat lithium ion batteries in a combustion furnace for combusting combustion targets by flames while inhibiting the housings of the lithium ion batteries from being directly contacted by the flames, this method involves placing the lithium ion batteries in a battery protection container that inhibits the housings of the lithium ion batteries from being directly contacted by the flames in the combustion furnace, and bringing the flames into contact with the external surface of the battery protection container, to thereby process the lithium ion batteries by heating (for example, see PTL 1).

However, existing techniques of this type have a problem that the battery protection container may become, for example, deformed or broken.

CITATION LIST

Patent Literature

PTL 1: Japanese Patent Application Laid-Open (JP-A) No. 2016-207648

SUMMARY OF INVENTION

Technical Problem

As described above, according to the existing technique that heats lithium ion secondary batteries by bringing flames into contact with the external surface of the battery protection container that protects the lithium ion secondary batteries, the battery protection container may deteriorate due to the direct contact by the flames, and may be deformed or broken. Hence, the existing technique may involve a lot of costs on production, replacement, and repair of the battery protection containers.

Moreover, according to the existing technique described above, when the battery protection container has deformed or broken by deterioration, there may be a case where excessive heat is applied to the lithium ion secondary batteries inside the battery protection container, valuable substances such as copper to be recovered from the lithium ion secondary batteries may be oxidized or embrittled, and the recovery rates and the grades of the valuable substances recovered may be low.

In addition, the existing technique described above thermally treats lithium ion secondary batteries using a fixed furnace in Examples. In a case where lithium ion secondary batteries are to be continuously thermally treated in a fixed furnace, there is a problem in that, after thermal treatment, the next lithium ion secondary batteries cannot be placed into the furnace until the temperature inside the furnace is lowered to a predetermined temperature (for example, 200° C. or lower) by providing sufficient time for heat dissipation in the furnace after the thermal treatment. This is because, when thermally treating lithium ion secondary batteries using a fixed furnace, there is a risk that the lithium ion secondary batteries may ignite immediately after the lithium ion secondary batteries are placed inside the furnace if the temperature inside the furnace is high. Therefore, the exiting technique described above cannot thermally treat lithium ion secondary batteries continuously, and does not have a sufficient thermal treatment efficiency (productivity).

The present invention aims for solving the various problems in the related art and achieving an object described below. That is, an object of the present invention is to provide a method for recovering a valuable substance, the method being able to inhibit deterioration of a target storing unit in which a target containing a valuable substance is stored, and to thermally treat a target efficiently and recover the valuable substance at a high recovery rate at a high grade.

Solution to Problem

Means for solving the above problems are as follows.

<1> A method for recovering a valuable substance, the method including:

a thermal treatment step of thermally treating a target containing a valuable substance using a continuous furnace configured to thermally treat the target while moving a target storing unit, in which the target is stored, such that the target storing unit is not contacted by a flame that is for thermal treatment; and a valuable substance recovering step of recovering the valuable substance from a thermally treated product of the target obtained in the thermal treatment step.

<2> The method for recovering a valuable substance according to <1>, wherein in the thermal treatment step, the target storing unit being moved is stopped, and the flame is radiated such that the target storing unit is not contacted by the flame.

<3> The method for recovering a valuable substance according to <1> or <2>, wherein when thermally treating a plurality of target storing units, each of which is the target storing unit, in the thermal treatment step, the flame is radiated from between adjoining ones of the target storing units such that the target storing units are not contacted by the flame.

<4> The method for recovering a valuable substance according to any one of <1> to <3>, wherein in the thermal treatment step, the flame is radiated more weakly while the target storing unit is moved than while the target storing unit is stopped.

<5> The method for recovering a valuable substance according to any one of <2> to <4>, wherein in the thermal treatment step, a ratio of a stop time for which the target storing unit is stopped to a moving time for which the target storing unit is moved satisfies an inequality below, the stop time/the moving time ≥10.

<6> The method for recovering a valuable substance according to any one of <1> to <5>, wherein the target storing unit is formed of iron or stainless steel.

<7> The method for recovering a valuable substance according to any one of <1> to <6>, wherein in the thermal treatment step, the target is thermally treated at 750° C. or higher and lower than 1,085° C.

<8> The method for recovering a valuable substance according to any one of <1> to <7>, wherein the target is a lithium ion secondary battery.

<9> The method for recovering a valuable substance according to <8>, wherein the lithium ion secondary battery has a housing containing aluminum, and in the thermal treatment step, the aluminum of the housing of the lithium ion secondary battery is melted and a melted product is separated.

<10> The method for recovering a valuable substance according to <8> or <9>, wherein the valuable substance contains copper.

<11> The method for recovering a valuable substance according to any one of <8>to <10>, wherein in the thermal treatment step, a combustion state of the lithium ion secondary battery is observed to judge whether combustion of the lithium ion secondary battery has finished or not, and when it is judged that combustion of the lithium ion secondary battery has finished, the thermally treating is terminated.

<12> The method for recovering a valuable substance according to any one of <1> to <11>, wherein the valuable substance recovering step includes:

a pulverizing step of pulverizing the thermally treated product, to obtain a pulverized product;

a classifying step of classifying the pulverized product at a classification point of 0.6 mm or greater and 2.4 mm or less, to obtain a coarse-grained product and a fine-grained product; and a magnetic force sorting step of sorting the coarse-grained product using a magnet having a magnetic flux density of 0.03 tesla or higher.

Advantageous Effects of Invention

According to the present invention, it is possible to solve the various problems in the related art and to provide a method for recovering a valuable substance, the method being able to inhibit deterioration of a target storing unit in which a target containing a valuable substance is stored, and to thermally treat a target efficiently and recover the valuable substance at a high recovery rate at a high grade.

BRIEF DESCRIPTION OF DRAWINGS

FIG. 1 is a concept diagram illustrating an example continuous furnace that can be used in a method for recovering a valuable substance of the present invention.

DESCRIPTION OF EMBODIMENTS (Method for Recovering a Valuable Substance)

A method for recovering a valuable substance of the present invention includes a thermal treatment step and a valuable substance recovering step, and further includes other steps as needed. The valuable substance recovering step of the method for recovering a valuable substance of the present invention preferably includes a pulverizing step, a classifying step, and a magnetic force sorting step, and further includes other steps as needed.

The method for recovering a valuable substance of the present invention is based on the present inventors' finding that according to the existing technique, when thermally treating targets such as lithium ion secondary batteries (LIB) to recover valuable substances such as copper from the targets, there may be a case where a target storing unit such as a container in which the targets are stored deteriorates. The method for recovering a valuable substance of the present invention is also based on the present inventors' finding that according to the existing technique, there may be a case where it is impossible to thermally treat the targets efficiently and the grades and the recovery rates of the valuable substances recovered are not sufficient.

More specifically, as described above, because the existing technique thermally treats lithium ion secondary batteries by bringing flames into direct contact with the battery protection container that protects the lithium ion secondary batteries, the battery protection container may deteriorate, and may be deformed or broken. Hence, the existing technique may involve a lot of costs on production, replacement, and repair of the battery protection container. Moreover, when the battery protection container has deformed or become broken by deterioration, valuable substances such as copper to be recovered from the lithium ion secondary batteries may be oxidized or embrittled, and the recovery rates and the grades of the valuable substances recovered may be low. In addition, the existing technique described above thermally treats lithium ion secondary batteries using a fixed furnace in Examples. Therefore, the existing technique cannot thermally treat lithium ion secondary batteries continuously, and does not have a sufficient thermal treatment efficiency (productivity).

As described, the present inventors have found the existing technique problematic in that the target storing unit in which targets containing valuable substances are stored may deteriorate, in that the efficiency when thermally treating the targets is not sufficient and the targets cannot be thermally treated efficiently, and in that the grades and the recovery rates of valuable substances recovered may not be sufficient.

The present inventors have conceived the present invention through earnest studies into a method for recovering a valuable substance, the method being able to inhibit deterioration of a target storing unit in which a target containing a valuable substance is stored, and to thermally treat the target efficiently and recover the valuable substance at a high recovery rate at a high grade.

That is, the present inventors have found it possible to inhibit deterioration of a target storing unit in which a target containing a valuable substance is stored, and to thermally treat the target efficiently and recover the valuable substance at a high recovery rate at a high grade, by a method for recovering a valuable substance, the method including a thermal treatment step of thermally treating a target containing a valuable substance using a continuous furnace configured to thermally treat the target while moving a target storing unit, in which the target is stored, such that the target storing unit is not contacted by a flame that is for thermal treatment, and a valuable substance recovering step of recovering the valuable substance from a thermally treated product of the target obtained in the thermal treatment step.

According to the method for recovering a valuable substance of the present invention, a target containing a valuable substance is thermally treated using a continuous furnace configured to thermally treat the target while moving a target storing unit, in which the target is stored, such that the target storing unit is not contacted by a flame for thermal treatment (thermal treatment step).

In this way, according to the present invention, the target is thermally treated using a continuous furnace configured to thermally treat the target while moving the target storing unit. Hence, according to the present invention, by placing a plurality of target storing units continuously in the continuous furnace, it is possible to thermally treat the targets stored in the target storing units continuously. Therefore, it is possible to thermally treat the targets more efficiently, i.e., to increase the number of targets that can be thermally treated in a unit time.

Moreover, according to the present invention, as described above, the target is thermally treated such that the target storing unit is not contacted by the flame for thermal treatment. Hence, according to the present invention, it is possible to avoid the target storing unit being heated excessively, and to inhibit deterioration of the target storing unit. Moreover, according to the present invention, because it is possible to inhibit deterioration of the target storing unit, it is possible to save maintenance costs for, for example, replacement and repair of the target storing unit.

Moreover, according to the method for recovering a valuable substance of the present invention, because it is possible to inhibit deterioration of the target storing unit since it is ensured that the target storing unit is not contacted by the flame for thermal treatment, it is possible to inhibit the valuable substance (for example, copper) contained in the target from being oxidized and embrittled due to, for example, the target storing unit being broken and the target being directly contacted by the flame for thermal treatment. Hence, it is possible to recover the valuable substance at a high recovery rate at a high grade in the valuable substance recovering step.

In this way, the method for recovering a valuable substance of the present invention including the thermal treatment step and the valuable substance recovering step specified above can inhibit deterioration of the target storing unit in which the target containing a valuable substance is stored, and can thermally treat the target efficiently and recover the valuable substance at a high recovery rate at a high grade.

In the following description, the details of, for example, the steps of the method for recovering a valuable substance of the present invention will be described.

<Thermal Treatment Step>

The thermal treatment step is a step of thermally treating a target containing a valuable substance using a continuous furnace configured to thermally treat the target while moving a target storing unit, in which the target is stored, such that the target storing unit is not contacted by a flame for thermal treatment. In other words, for example, the thermal treatment step is a step of thermally treating the target stored in the target storing unit by using a continuous furnace and radiating a flame such that the target storing unit is not directly contacted by the flame, to thereby obtain a thermally treated product. A thermally treated product represents a product obtained by thermally treating the target.

<<Target and Valuable Substance>>

The target is not particularly limited and may be appropriately selected in accordance with the intended purpose so long as the target contains a valuable substance and can be thermally treated in a continuous furnace while being stored in the target storing unit. Examples of the target include secondary batteries such as a lithium ion secondary battery and a nickel-hydrogen battery. Representatively, it is preferable to use a lithium ion secondary battery.

A valuable substance represents a substance that can suffice as a transaction object without being discarded. Examples of the valuable substance include various metals. When the target is a lithium ion secondary battery, examples of the valuable substance include a high-grade carbon (C) concentrate, copper (Cu), aluminum (Al), lithium (Li), cobalt (Co), and nickel (Ni). A high-grade (e.g., grade of 80% or higher) carbon (C) concentrate can be suitably used as, for example, a reductant in smelting of metals.

Lithium Ion Secondary Battery

The lithium ion secondary battery is not particularly limited and may be appropriately selected in accordance with the intended purpose. Examples of the lithium ion secondary battery include defective lithium ion secondary batteries generated in the production process of lithium ion secondary batteries, lithium ion secondary batteries discarded due to, for example, defects of the devices in which they are used and expired life of the devices in which they are used, and used lithium ion secondary batteries discarded due to expired life.

The structure, size, and material of the lithium ion secondary battery are not particularly limited and may be appropriately selected in accordance with the intended purpose.

The shape of the lithium ion secondary battery is not particularly limited and may be appropriately selected in accordance with the intended purpose. Examples of the shape of the lithium ion secondary battery include a laminate shape, a cylindrical shape, a button shape, a coin shape, a square shape, and a flat shape.

The form of the lithium ion secondary battery is not particularly limited and may be appropriately selected in accordance with the intended purpose. Examples of the form of the lithium ion secondary battery include a battery cell, a battery module, and a battery pack. A battery module represents a product including a plurality of battery cells, which are unit cells, in one housing in a connected state. A battery pack represents a product including a plurality of battery modules in one housing. A battery pack may be equipped with, for example, a controller or a cooling device.

Examples of the lithium ion secondary battery include a lithium ion secondary battery including a positive electrode, a negative electrode, a separator, an electrolytic solution containing an electrolyte and an organic solvent, and an exterior container, which is a battery case in which the positive electrode, the negative electrode, the separator, and the electrolytic solution are stored. A lithium ion secondary battery from which, for example, a positive electrode or a negative electrode is lost, may also be used.

Positive Electrode

The positive electrode is not particularly limited and may be appropriately selected in accordance with the intended purpose. It is preferable that the positive electrode includes a positive electrode current collector and contains a positive electrode material containing either or both of cobalt and nickel. The shape of the positive electrode is not particularly limited and may be appropriately selected in accordance with the intended purpose. Examples of the shape of the positive electrode include a flat plate shape and a sheet shape.

Positive Electrode Current Collector

For example, the shape, structure, size, and material of the positive electrode current collector are not particularly limited and may be appropriately selected in accordance with the intended purpose.

Examples of the shape of the positive electrode current collector include a foil shape.

Examples of the material of the positive electrode current collector include stainless steel, nickel, aluminum, copper, titanium, and tantalum. Among these materials, aluminum is preferable.

The positive electrode material is not particularly limited and may be appropriately selected in accordance with the intended purpose. Examples of the positive electrode material include a positive electrode material that contains at least a positive electrode active substance containing lithium, and that contains a conducting agent and a binder resin as needed.

The positive electrode active substance is not particularly limited and may be appropriately selected in accordance with the intended purpose. A positive electrode active substance containing either or both of cobalt and nickel is preferable.

Examples of the positive electrode active substance include lithium manganate ($LiMn_2O_4$) referred to as an LMO system, lithium cobaltate ($LiCoO_2$) referred to as an LCO system, $LiNi_xCo_yMn_zO_2$ (x+y+z=1) referred to as a ternary system and an NCM system, $LiNi_2Co_yAl_z$ (x+y+z=1) referred to as an NCA system, lithium iron phosphate ($LiFePO_4$), lithium cobalt-nickelate ($LiCo_{1/2}Ni_{1/2}O_2$), and lithium titanate ($Li_2TiO_3$). As the positive electrode active substance, these materials may be used in combination.

The conducting agent is not particularly limited and may be appropriately selected in accordance with the intended purpose. Examples of the conducting agent include carbon black, graphite, carbon fiber, and metal carbides.

The binder resin is not particularly limited and may be appropriately selected in accordance with the intended purpose. Examples of the binder resin include homopolymers or copolymers of, for example, vinylidene fluoride, tetrafluoroethylene, acrylonitrile, and ethylene oxide, and styrene-butadiene rubbers.

Negative Electrode

The negative electrode is not particularly limited and may be appropriately selected in accordance with the intended purpose. It is preferable that the negative electrode includes a negative electrode current collector and contains a negative electrode active substance containing carbon (C).

The shape of the negative electrode is not particularly limited and may be appropriately selected in accordance with the intended purpose. Examples of the shape of the negative electrode include a flat plate shape and a sheet shape.

Negative Electrode Current Collector

For example, the shape, structure, size, and material of the negative electrode current collector are not particularly limited and may be appropriately selected in accordance with the intended purpose.

Examples of the shape of the negative electrode current collector include a foil shape.

Examples of the material of the negative electrode current collector include stainless steel, nickel, aluminum, copper, titanium, and tantalum. Among these materials, copper is preferable.

The negative electrode active substance is not particularly limited and may be appropriately selected in accordance with the intended purpose so long as the negative electrode active substance contains carbon (C). Examples of the negative electrode active substance include carbon materials such as graphite and hard carbon, titanate, and silicon. As the negative electrode active substance, these materials may be used in combination.

The material of the exterior container (housing) of the lithium ion secondary battery is not particularly limited and may be appropriately selected in accordance with the intended purpose. Examples of the material of the exterior container include aluminum, iron, stainless steel, and resins (plastics).

According to the present invention, for example, when a lithium ion secondary battery containing a large quantity of aluminum, such as a lithium ion secondary battery having a housing formed of aluminum, is the target, it is possible to melt aluminum, which is an example of the valuable substance, and separate aluminum as a melted product in the thermal treatment step. In other words, in the method for recovering a valuable substance of the present invention, it is preferable that the lithium ion secondary battery has a housing containing aluminum, and that aluminum of the housing of the lithium ion secondary battery be melted and a melted product be separated in the thermal treatment step.

<<Target Storing Unit>>

The target storing unit is not particularly limited and may be appropriately selected in accordance with the intended purpose so long as the target can be stored in the target storing unit and the target storing unit can be placed in a continuous furnace. Examples of the target storing unit include a container, a drum, and the exterior container of a lithium ion secondary battery pack or module.

As the material of the target storing unit, for example, one that has a melting point higher than the temperature (thermal treatment temperature) in the thermal treatment in a continuous furnace is preferable. More specifically, for example, iron and stainless steel are preferable as the material of the target storing unit. In other words, in the method for recovering a valuable substance of the present invention, it is preferable that the target storing unit be formed of iron or stainless steel. Such a target storing unit can be better inhibited from, for example, deterioration, deformation, and breakage in the thermal treatment.

The size of the target storing unit is not particularly limited and may be appropriately selected in accordance with the intended purpose so long as the target can be stored in the target storing unit and the target storing unit can be placed in a continuous furnace. For example, the size of the target storing unit is preferably, for example, a size that can be placed on a wheeled platform of the continuous furnace, and a size with which adjoining target storing units do not contact each other when the target storing units are placed on their respective wheeled platforms, i.e., a size by which a gap is secured between the target storing units.

The shape and structure of the target storing unit are not particularly limited and may be appropriately selected in accordance with the intended purpose so long as the target can be stored in the target storing unit.

It is preferable that the target storing unit has an opening through which a gas is circulatable. In this case, it is preferable that a lithium ion secondary battery be stored in the target storing unit such that a gas does not circulate through any place other than the opening. With an opening in the storing container, it is possible to control the pressure and the atmosphere inside the storing container.

The shape of the opening is not particularly limited and may be appropriately selected in accordance with the intended purpose. The position of the opening on the target storing unit is not particularly limited and may be appropriately selected in accordance with the intended purpose so long as a gas is circulatable through the position during thermal treatment. A plurality of openings may be formed in the target storing unit.

A hole formed in the exterior container of a lithium ion secondary battery pack or module may be used as the opening. A lithium ion secondary battery pack typically has a hole through which a cable or a plug for charging or discharging is connected to a portion inside the pack or module in which electricity flows. This hole may be used as the opening.

The size (area) of the opening is not particularly limited, may be appropriately selected in accordance with the intended purpose, yet is preferably less than or equal to 12.5% and more preferably less than or equal to 6.3% of the surface area of the target storing unit. When the size of the opening is less than or equal to 12.5% of the surface area of the target storing unit, it is possible to inhibit oxidization of valuable substances contained in the current collectors during thermal treatment. In the following description, the area of the opening relative to the surface area of the target storing unit may be referred to as an "opening percentage". When the target storing unit has a plurality of openings, the opening percentage may be the total of the areas of the openings relative to the surface area of the target storing unit.

When the opening percentage of the target storing unit is in the preferable range specified above, the atmosphere inside the target storing unit during thermal treatment can become a hypoxic atmosphere, provided that the atmosphere outside the target storing unit is, for example, the atmospheric atmosphere.

As the target storing unit, one that has an openable and closable lid for letting in a lithium ion secondary battery is preferable. This facilitates storing of the lithium ion secondary battery inside the target storing unit, and removal of the thermally treated lithium ion secondary battery (thermally treated product) after the thermal treatment step.

The lid is not particularly limited and may be appropriately selected in accordance with the intended purpose.

The lid may be secured in an openable and closable manner by, for example, a hinge. Alternatively, the lid may be attached or detached for opening and closing.

<Continuous Furnace>

The continuous furnace used in the thermal treatment step is not particularly limited and may be appropriately selected in accordance with the intended purpose so long as the continuous furnace can thermally treat the target while moving the target storing unit, in which the target is stored, such that the target storing unit is not contacted by the flame for thermal treatment. Examples of the continuous furnace (tunnel furnace) include a pusher-type continuous furnace.

Here, for example, in a case where lithium ion secondary batteries serving as the target are to be continuously treated in a batch-type furnace (batch furnace), the next lithium ion secondary battery to be treated cannot be placed into the furnace until heat dissipation from inside the furnace is completed after thermal treatment of a lithium ion secondary battery is completed. However, by using a continuous furnace (tunnel furnace) and providing a heat dissipation area after the thermal treatment area, it is possible to continuously and efficiently perform heat dissipation from the lithium ion secondary battery that has been thermally treated previously and the thermal treatment of the lithium ion secondary battery to be treated next.

The flame for thermal treatment can be radiated by, for example, a flame radiating unit provided in the continuous furnace. The flame radiating unit is not particularly limited and may be appropriately selected in accordance with the intended purpose. Examples of the flame radiating unit include a burner.

It is preferable that an air ratio (a ratio of an actual amount of air to a theoretical amount of air) in the burner, which is an example of the flame radiating unit, be 2 or less. When the air ratio in the burner is 2 or less, it is possible to better inhibit deterioration of the target storing unit due to overheating of the space surrounding the burner and the air supplied from the burner.

As the continuous furnace, for example, one that, when performing the thermal treatment step, can stop the target storing unit that is being moved and radiate a flame such that the target storing unit is not contacted by the flame is preferable. In other words, in the present invention, in the thermal treatment step, it is preferable to stop the target storing unit that is being moved and radiate a flame such that the target storing unit is not contacted by the flame. In this way, it is possible to more securely avoid the target storing unit being contacted by the flame.

More specifically, it is preferable to radiate the flame more weakly while the target storing unit is moved than while the target storing unit is stopped in the thermal treatment step. In this way, it is possible to more securely avoid the target storing unit being contacted by the flame.

When radiating a flame more weakly while the target storing unit is moved than while the target storing unit is stopped, it is optional whether to weaken (reduce) the output power for radiating the flame or to stop radiating the flame.

For example, when thermally treating a plurality of target storing unit, a continuous furnace that can radiate a flame from between adjoining target storing units is preferable as the continuous furnace. In other words, in the present invention, when thermally treating a plurality of target storing units, it is preferable to radiate a flame from between adjoining target storing units such that the target storing units are not contacted by the flame. In this way, it is possible to more securely avoid the target storing units being contacted by the flame when thermally treating a plurality of target storing units.

As the continuous furnace that can radiate a flame from between adjoining target storing units, for example, one in which a flame radiating unit is disposed at a position between adjoining target storing units when the target storing units are stopped to be heated can be used.

FIG. 1 is a concept diagram illustrating an example of the continuous furnace that can be used in the method for recovering a valuable substance of the present invention.

In the example illustrated in FIG. 1, the continuous furnace includes a temperature-raising standby chamber 11, a temperature raising section 12, a retention section 13, and a cooling standby chamber 14, and includes actuatable doors 15 that can be opened and closed by, for example, a hydraulic pressure between the temperature-raising standby chamber 11 and the temperature raising section 12 and between the cooling standby chamber 14 and the retention section 13. A secondary combustion furnace 19 serving an exhaust gas processing unit is joined to the continuous furnace illustrated in FIG. 1 through a flue 20 above the retention section 13. FIG. 1 is a concept diagram of the inside space of the continuous furnace seen in a horizontal perspective.

In the example illustrated in FIG. 1, target storing units 17, in which targets are stored, are placed on respective ten wheeled platforms 16, and the wheeled platforms 16 and the target storing units 17 move from the temperature-raising standby chamber 11 to the temperature raising section 12 in order in the direction indicated by the arrow. When moving the wheeled platforms 16 and the target storing units 17, for example, by pushing the wheeled platform 16 positioned at the leftmost end in the temperature raising section 12 to the direction indicated by the arrow, it is possible to cause the wheeled platforms 16 to contact and push each other and to thereby move the respective wheeled platforms 16. In the example illustrated in FIG. 1, flames 18 are radiated more weakly while the wheeled platforms 16 and the target storing units 17 are moved than while the wheeled platforms 16 and the target storing units 17 are stopped.

Here, in the temperature raising section 12, the flames 18 are radiated by flame radiating units such that the target storing units 17 are not contacted by the flames 18, and the targets stored in the target storing units 17 are thermally treated by the flames 18. More specifically, in the example illustrated in FIG. 1, when the target storing units 17 are stopped to be heated, the flame radiating units are disposed at positions between adjoining target storing units 17, and the flames 18 are radiated to between adjoining target storing units 17. In the example illustrated in FIG. 1, the flames 18 are radiated from both the left and right-hand sides across the direction in which the wheeled platforms 16 and the target storing units 17 travel in the continuous furnace (i.e., the direction indicated by the arrow). In this way, in the example illustrated in FIG. 1, the flames 18 are radiated in a direction towards the side surfaces of the target storing units 17 such that the target storing units 17 are not contacted by the flames 18.

In the example illustrated in FIG. 1, flames 18 that are necessary to retain the internal furnace temperature in the retention section 13 are radiated. Then, the wheeled platforms 16 and the target storing units 17 move to the cooling standby chamber 14 and are cooled.

When thermally treating the targets by repeating: moving the target storing units while stopping radiating the flames; and heating the target storing units by radiating the flames such that the target storing units are not contacted by the flames as described above, a ratio between a moving time for which the target storing units are moved and a stop time for which the target storing units are stopped is not particularly limited and may be appropriately selected in accordance with the intended purpose so long as it is possible to thermally treat the targets sufficiently. It is preferable that the ratio between the moving time for which the target storing units are moved and the stop time for which the target storing units are stopped satisfy an inequality below.

Stop Rime/Moving Time ≥10

When the ratio of the stop time to the moving time in the thermal treatment step satisfies the inequality above, it is possible to make the moving time shorter than the stop time. Therefore, it is possible to inhibit temperature reduction in the continuous furnace during the thermal treatment and to perform the thermal treatment more efficiently.

The flame radiation time per one flame radiation by stopping the target storing unit is preferably 5 minutes or longer and 3 hours or shorter. When the flame radiation time is 5 minutes or longer and 3 hours or shorter, it is possible to avoid thermally treating the target (for example, a lithium ion secondary battery) insufficiently, and to save the amount of the fuel necessary for the thermal treatment while inhibiting embrittlement of the valuable substance to be recovered.

Here, in the present invention, when the target is a lithium ion secondary battery, it is preferable to observe the combustion state of the lithium ion secondary battery in the thermal treatment step to judge whether combustion of the lithium ion secondary battery has finished or not, and to terminate the thermal treatment when it is judged that combustion of the lithium ion secondary battery has finished. This makes it possible to thermally treat the lithium ion secondary battery without overdoing or underdoing, to better inhibit deterioration of the target storing unit, and to perform the thermal treatment more efficiently in a short time.

The method for observing the combustion state of the lithium ion secondary battery is not particularly limited and may be appropriately selected in accordance with the intended purpose. Examples of the method include visual observation, an analysis of an image captured by a camera, an analysis of temperature information obtained by thermography, a thermocouple, or a radiation thermometer, and an analysis of changes in the concentrations of gases (e.g., CO, $CO_2$, and $O_z$). These methods may be used in combination.

More specifically, it is possible to judge whether combustion of a lithium ion secondary battery has finished or not, by, for example, confirming extinction of ignition from the target storing unit based on an image captured by a camera installed inside the furnace, or opening the entrance of the furnace only to a degree that the gas inside the furnace does not leak outside the system and confirming extinction of ignition from the target storing unit by visual observation from outside the furnace.

When terminating the thermal treatment when it is judged that combustion of the lithium ion secondary battery has finished, for example, it is optional whether to stop all flames in the continuous furnace or to radiate flames necessary to retain the temperature inside the continuous furnace such that the target storing units are not contacted by the flames.

<<Thermal Treatment Conditions>>

The conditions (thermal treatment conditions) for thermally treating (heating) the target are not particularly limited and may be appropriately selected in accordance with the intended purpose, so long as the conditions enable the respective constituent components of the target to be brought into a state from which a valuable substance can be recovered in the valuable substance recovering step described below.

Examples of the thermal treatment conditions include thermal treatment temperature, thermal treatment time, and atmosphere.

The thermal treatment temperature represents a temperature of the target (for example, a lithium ion secondary battery) during the thermal treatment. It is possible to measure the thermal treatment temperature by inserting a thermometer such as a thermocouple or a thermistor into the target at the thermal treatment temperature.

The thermal treatment temperature can be appropriately selected in accordance with the target.

When the target is a lithium ion secondary battery, it is preferable that the thermal treatment temperature be higher than or equal to the melting point of the housing (exterior container) of the lithium ion secondary battery. At such a temperature, when the housing of the lithium ion secondary battery is formed of a metal, the housing can be melted in the thermal treatment step, and, for example, it is easy to recover the metal derived from the housing and, for example, the electrodes of the lithium ion secondary battery separately from each other by disposing a receptacle into which to recover the melted metal of the housing below the lithium ion secondary battery.

More specifically, for example, when the housing of a lithium ion secondary battery contains aluminum, it is preferable that the thermal treatment temperature be higher than or equal to 660° C., which is the melting point of aluminum. This makes it possible to melt and recover aluminum contained in the housing of the lithium ion secondary battery in the thermal treatment step. That is, when a lithium ion secondary battery including a housing containing aluminum is the target, the method for recovering a valuable substance of the present invention can easily recover aluminum derived from the housing by easily sorting (separating) aluminum contained in the housing and other parts (for example, electrodes) of the lithium ion secondary battery from each other by thermally treating the lithium ion secondary battery at higher than or equal to 660° C. in the thermal treatment step.

For recovering aluminum of the housing of the lithium ion secondary battery, for example, a receptacle for aluminum may be disposed on the wheeled platform of the continuous furnace in the thermal treatment step, so aluminum can be recovered. Moreover, because aluminum has a low viscosity, aluminum that has accumulated inside the target storing unit is shaken inside the target storing unit when the wheeled platform moves, and drops into the receptacle. This makes it possible to better improve the recovery rate of aluminum.

In the method for recovering a valuable substance of the present invention, when the target is a lithium ion secondary battery, the thermal treatment temperature is preferably 750° C. or higher, more preferably 750° C. or higher and 1,080° C. or lower, and particularly preferably 750° C. or higher and 900° C. or lower.

When the thermal treatment temperature is 750° C. or higher, lithium in $Li(Ni/Co/Mn)O_2$ contained in the positive electrode active substance of the lithium ion secondary battery or lithium in $LiPF_6$ contained in the electrolyte of the lithium ion secondary battery can be changed to aqueous solution-soluble substances, such as lithium fluoride (LiF), lithium carbonate ($Li_2CO_3$), and lithium oxide ($Li_2O$), so it is possible to separate lithium from impurities other than fluorine by leaching. Moreover, when the thermal treatment temperature is 750° C. or higher, cobalt oxide and nickel oxide contained in the positive electrode active substance are reduced to metals, and it is possible to grow these metals to a particle diameter with which it is easy to magnetically attract the metals in a magnetic sorting step described below. This increase in the particle diameter of the metals is more apparent as the thermal treatment is performed at a higher temperature.

Moreover, for example, when a lithium ion secondary battery including a housing containing aluminum is the target and the thermal treatment temperature is higher than or equal to 750° C. (which is a temperature higher than 660° C., which is the melting point of aluminum) and lower than 1,085° C. (which is the melting point of copper), it is possible to separate and recover aluminum derived from the housing, and to better inhibit oxidization or embrittlement of copper contained in the negative electrode current collector and better improve the recovery rate and the grade of copper.

The thermal treatment time (a time for which the target is thermally treated) is not particularly limited, may be appropriately selected in accordance with the intended purpose, yet is preferably, for example, 1 minute or longer and 10 hours or shorter, more preferably 1 minute or longer and 5 hours or shorter, and particularly preferably 1 minute or longer and 3 hours or shorter. The thermal treatment time may be, for example, a time taken until the target reaches the thermal treatment temperature specified above, and the retention time may be short. When the thermal treatment time is 1 minute or longer and 5 hours or shorter, there are advantages that the costs taken for thermal treatment can be saved, and the thermal treatment efficiency can be improved.

The atmosphere used in the thermal treatment is not particularly limited and may be appropriately selected in accordance with the intended purpose. Examples of the atmosphere include an atmospheric atmosphere, an inert atmosphere, a reducing atmosphere, and a hypoxic atmosphere.

The atmospheric atmosphere represents an atmosphere using air.

Examples of the inert atmosphere include an atmosphere formed of nitrogen or argon.

The reducing atmosphere represents an atmosphere in which an inert atmosphere such as nitrogen or argon contains, for example, CO, $H_2$, $H_2S$, and $SO_2$.

The hypoxic atmosphere represents an atmosphere in which an oxygen partial pressure is 11% or lower.

Among these atmospheres, the hypoxic atmosphere is preferable because the hypoxic atmosphere can minimize oxidization of the target storing unit and of valuable substances such as copper by oxygen and it is possible to realize the hypoxic atmosphere by controlling the amount of oxygen to be supplied to the burners without a special atmosphere adjustment.

<Valuable Substance Recovering Step>

The valuable substance recovering step is a step of recovering a valuable substance from a thermally treated product of the target obtained in the thermal treatment step.

The valuable substance recovering step is not particularly limited and may be appropriately selected in accordance with the intended purpose so long as a valuable substance can be recovered from the thermally treated product. As described above, it is preferable that the valuable substance recovering step includes a pulverizing step, a classifying step, and a magnetic force sorting step.

<<Pulverizing step>>

The pulverizing step is a step of pulverizing a thermally treated product to obtain a pulverized product.

The pulverizing step is not particularly limited and may be appropriately selected in accordance with the intended purpose so long as the pulverizing step is a step of pulverizing a thermally treated product (roasted product) to obtain a pulverized product. The pulverized product represents a product obtained by pulverizing a thermally treated product.

The pulverizing step is preferably a step of pulverizing a thermally treated product by, for example, an impact, to obtain a pulverized product. For example, when a lithium ion secondary battery is selected as the target, it is more preferable to perform a preparatory pulverization, in which a thermally treated product is cut with a cutting device, before applying an impact to the thermally treated product, when there is a condition of not melting the housing of the lithium ion secondary battery in the thermal treatment step.

Examples of the pulverization method by an impact include a method of throwing the thermally treated product using a rotating beating board and slamming the thermally treated product against an impact board to apply an impact, and a method of beating the thermally treated product using a rotating beater. The method can be performed with, for example, a hammer crusher. The pulverization method by an impact may be a method of beating the thermally treated product using a ball formed of, for example, ceramic. This method can be performed with a ball mill. Pulverization by an impact can also be performed with, for example, a biaxial crusher configured to perform pulverization by compression and having a short width of cut and a short blade length.

Examples of the pulverization method by an impact also include a method of beating the thermally treated product with two rotating chains to apply an impact. This method can be performed with a chain mill.

By pulverization of a thermally treated product of a lithium ion secondary battery by an impact, the positive electrode current collector (for example, aluminum (Al)) is pulverized, whereas the negative electrode current collector (for example, copper (Cu)) that does not significantly change in form exists in the form of, for example, a foil. Therefore, in the pulverizing step, the negative electrode current collector does not go beyond being cut. Hence, it is possible to obtain a pulverized product in which valuable substances derived from the positive electrode current collector (for example, aluminum) and valuable substances derived from the negative electrode current collector (for example, copper (Cu)) can be efficiently separated from each other in a classifying step described below.

The pulverization time in the pulverizing step is not particularly limited and may be appropriately selected in accordance with the intended purpose. For example, when the target is a lithium ion secondary battery, the pulverization time per 1 kg of a lithium ion secondary battery is preferably 1 second or longer and 30 minutes or shorter, more preferably 2 seconds or longer and 10 minutes or shorter, and particularly preferably 3 seconds or longer and 5 minutes or shorter.

The pulverization conditions in the pulverizing step are as follows. For example, for pulverization using an impact-type or beating-type pulverizer such as a chain mill or a hammer mill, it is preferable to set the tip speed of the chain or the hammer to 10 m/sec or higher and 300 m/sec or lower, and to set the residence time of the target in the pulverizer to 1 second or longer and 10 minutes or shorter. In the method for recovering a valuable substance of the present invention, these conditions make it possible to pulverize copper and aluminum, which are positive electrode materials, and members derived from the housing and formed of, for example, Fe, without excessively minutely pulverizing them.

<<Classifying Step>>

The classifying step is a step of classifying a pulverized product at a classification point of 0.6 mm or greater and 2.4 mm or less to obtain a coarse-grained product and a fine-grained product.

The classifying step is not particularly limited and may be appropriately selected in accordance with the intended purpose so long as the classifying step is a step through which it is possible to obtain a coarse-grained product and a fine-grained product by classifying a pulverized product at a classification point of 0.6 mm or greater and 2.4 mm or less. When the target is a lithium ion secondary battery, it is possible to separate, for example, copper (Cu), iron (Fe), and aluminum (Al) into a coarse-grained product and separate, for example, lithium (Li), cobalt (Co), nickel (Ni), manganese (Mn), and carbon (C) into a fine-grained product through the classifying step.

The classifying step can be performed using, for example, a vibrating sieve, a multi-stage vibrating sieve, a cyclone, and a JIS 28801 standard sieve.

The particle size (classification point or mesh size of a sieve) for classification is preferably 0.6 mm or greater and 2.4 mm or less, more preferably 0.85 mm or greater and 1.7 mm or less, and particularly preferably approximately 1.2 mm.

When the particle size for classification is 2.4 mm or less, it is possible to inhibit inclusion of, for example, copper (Cu), iron (Fe), and aluminum (Al) into the fine-grained product. When the particle size for classification is 0.6 mm or greater, it is possible to inhibit inclusion of, for example, carbon (C), lithium (Li), cobalt (Co), nickel (Ni), and manganese (Mn) into the coarse-grained product.

Sieving (classification) into an oversize product (coarse-grained product) and an undersize product (fine-grained product) may be repeated a plurality of times. This re-sieving can further reduce the impurity grade in each product.

The pulverizing step and the classifying step may be performed simultaneously. For example, the pulverizing step and the classifying step may be performed as a pulverizing/classifying step (pulverization and classification) of pulverizing a thermally treated product obtained in the thermal treatment step while classifying an obtained pulverized product into a coarse-grained product and a fine-grained product. <<Magnetic Force Sorting Step>>

The magnetic force sorting step is a step of sorting a coarse-grained product using a magnet having a magnetic flux density of 0.03 tesla or higher. In other words, in the magnetic force sorting step, a pulverized product is subjected to sorting by a magnetic force, to thereby recover a valuable substance from the target (or from a pulverized product obtained by thermally treating and pulverizing the target). In the following description, sorting by a magnetic force may be referred to as "magnetic force sorting" or "magnetic sorting".

The magnetic force sorting step can be performed using, for example, a publicly-known magnetic force sorter (magnetic sorter).

The magnetic force sorter that can be used in the present invention is not particularly limited and may be appropriately selected in accordance with the intended purpose. Examples of the magnetic force sorter include a bar magnet, a lattice magnet, a rotary magnet, a magnet strainer, a high magnetic force pulley (magnet pulley) magnetic sorter, a drum-shaped magnetic sorter, and a suspended magnetic sorter. Among these magnetic force sorters, it is preferable to use a drum-shaped magnetic sorter and a suspended magnetic sorter in the present invention.

In the magnetic force sorting step, for example, sorting is performed with a magnetic force that can sort a magnetically attractable material and a non-magnetically attractable material contained in the target from each other depending on the kind of the target (or the kinds of valuable substances contained in the target).

A magnetically attractable material represents a material that can be attracted to a magnetic force source by an attractive force generated between the material and the magnetic force source by a magnetic force generated by the magnetic force source (for example, a magnet and an electromagnet) configured to generate a magnetic force (a magnetic field). Examples of the magnetically attractable material include ferromagnetic metals. Examples of ferromagnetic metals include iron, nickel, and cobalt.

A non-magnetically attractable material represents a material that is not attracted to the magnetic force source by a magnetic force generated by the magnetic force source. The non-magnetically attractable material is not particularly limited and may be appropriately selected in accordance with the intended purpose. Examples of non-magnetically attractable metal materials include paramagnetic or diamagnetic metals. Examples of paramagnetic or diamagnetic metals include aluminum, manganese, gold, silver, and copper.

For example, when a lithium ion secondary battery is selected as the target, magnetically attractable materials such as iron contained in the pulverized product and non-magnetically attractable materials containing, for example, copper, which is a valuable substance, contained in the pulverized product can be separated from each other in the magnetic force sorting step.

In the above example in which a lithium ion secondary battery is the target, a case where the valuable substance to be sorted is contained in the non-magnetically attractable materials is described. The present invention is not limited to this example. For example, depending on the kind of the target, the valuable substance to be sorted may be contained in the magnetically attractable materials.

The magnetic force in the magnetic force sorting step is not particularly limited and may be appropriately selected in accordance with the intended purpose so long as the magnetic force is 0.03 T (tesla) or higher. For example, when sorting iron, the magnetic force is preferably 0.01 T (tesla) or higher and 0.3 T or lower. When sorting stainless steel, a magnetic force higher than the range specified above may be used. Different magnetic forces may be combined and used in multiple stages.

In this way, the method for recovering a valuable substance of the present invention can selectively separate magnetically attractable materials such as iron and stainless steel.

<Other Steps>

The other steps are not particularly limited and may be appropriately selected in accordance with the intended purpose.

<Example Embodiment>

Here, an example embodiment of the recovering method for a lithium ion secondary battery of the present invention will be described. The present embodiment is an example in which a lithium ion secondary battery is selected as the target.

In the present embodiment, first, the lithium ion secondary battery serving as the target is placed in a container and the container is placed on a wheeled platform. While the container is being moved, the lithium ion secondary battery is thermally treated in a continuous furnace, to obtain a thermally treated product of the lithium ion secondary battery. When performing the thermal treatment, burners are disposed at positions between adjoining containers as illustrated in FIG. 1, and the thermal treatment is performed such that the cylindrical container are not contacted by flames radiated from the burners. Flames are radiated more weakly from the burners while the wheeled platform and the container are moved than while the wheeled platform and the container are stopped.

Moreover, during the thermal treatment, the combustion state of the lithium ion secondary battery is observed to judge whether combustion of the lithium ion secondary battery has finished or not. When it is judged that combustion of the lithium ion secondary battery has finished, the thermal treatment is terminated.

Furthermore, during the thermal treatment, the lithium ion secondary battery is thermally treated at 750° C. or higher and lower than 1,085° C., to melt aluminum contained in the lithium ion secondary battery and recover aluminum as a melted product.

Next, the thermally treated product of the lithium ion secondary battery is pulverized to obtain a pulverized product. Subsequently, the pulverized product is classified into a coarse-grained product (oversize product) and a fine-grained product (undersize product). Copper (Cu) is sorted and concentrated into the coarse-grained product (oversize product).

Next, the coarse-grained product (oversize product) is subjected to sorting by a magnetic force (magnetic sorting), to sort the coarse-grained product (oversize product) into magnetically attractable materials and non-magnetically attractable materials. Here, iron (Fe) is sorted and concentrated into the magnetically attractable materials, and copper (Cu), which is a valuable substance, is sorted and concentrated into the non-magnetically attractable materials.

In this way, in the present embodiment, it is possible to thermally treat the lithium ion secondary battery efficiently and recover copper, which is a valuable substance, at a high recovery rate at a high grade while inhibiting deterioration of the container.

EXAMPLES

The present invention will be described below by way of Examples. The present invention should not be construed as being limited to these Examples.

Example 1

<Thermal treatment>

Square-shaped lithium ion secondary battery cells approximately 100 kg), of which the positive electrode material (positive electrode active substance) was $LiNi_xCo_yMn_zO_2$ (x+y+z=1), of which the negative electrode material was carbon (graphite), and of which the exterior cases were formed of aluminum, were used as the target. As a continuous furnace, a pusher-type continuous furnace having an overall length of 24.6 m (obtained from Mino Ceramic Co., Ltd.) was used.

As the wheeled platforms to be introduced into the continuous furnace, ten wheeled platforms each having a floor area (loading area) of 2.2 m×2.2 m were used side by side. A receptacle for aluminum was disposed on each wheeled platform, and a cylindrical container (an example of the target storing unit) formed of stainless steel, having a diameter of 0.6 m and a height of 0.9 m, and having a bottom opening through which aluminum would drop was placed in the center of the wheeled platform on the receptacle for aluminum. Spaces of 0.8 m were secured from both the leading and trailing ends of the wheeled platform to the cylindrical container.

The interval between the rails on which the wheeled platform would be moved was 1.2 m.

Next, the cylindrical container was packed with the lithium ion secondary battery cells specified above. The temperature (thermal treatment temperature) inside the continuous furnace was set to approximately 850° C.

The wheeled platforms were installed such that the number of wheeled platforms in the continuous furnace would be constantly eight. The wheeled platforms were moved once every 60 minutes, and moved for 32 seconds per move. That is, when a given wheeled platform had been moved 8 times repeatedly (or the target had been thermally treated for approximately 8 hours), the wheeled platform was ejected from inside the continuous furnace so that heat would be dissipated from the wheeled platform.

When performing the thermal treatment while the wheeled platforms and the cylindrical containers were being stopped, burners were disposed at positions between adjoining cylindrical containers (and on both the left and right-hand sides across the direction in which the wheeled platforms travelled) inside the continuous furnace as illustrated in FIG. 1, and the thermal treatment was performed such that the cylindrical containers would not be contacted by flames radiated from the burners.

During the thermal treatment, flames were radiated from the burners on both the left and right-hand sides across the direction in which the wheeled platforms and the cylindrical containers travelled in the continuous furnace, and it was seen to it that the rails on which the wheeled platforms were moved would not be contacted by the flames.

<Pulverization and Classification>

Next, using a hammer crusher (MAKINO-TYPE SWING HAMMER CRUSHER HC-20-3.7, obtained from Makino Mfg. Co., Ltd.) as a pulverizer, the thermally treated lithium ion secondary batteries (thermally treated product of the lithium ion secondary batteries) were pulverized at 50 Hz (at a hammer circumferential speed of 38 m/s) with a punching metal hole diameter of 10 mm at the outlet, to obtain a pulverized product of the lithium ion secondary batteries.

Next, using a sieve having a mesh size (classification point) of 1.2 mm (with a diameter of 200 mm, obtained from Tokyo Screen Co., Ltd.), the pulverized product of the lithium ion secondary batteries was sieved (classified). After sieving, the oversize product (coarse-grained product) and the undersize product (fine-grained product) above and below the 1.2 mm sieve were individually collected.

<Magnetic Force Sorting>

Next, using a drum-shaped dry magnetic sorter (CC 15"Φ×20"W, obtained from Eriez Magnetics Japan Co., Ltd.) having a magnetic flux density of 1,500 G (0.15 T), the obtained coarse-grained product was subjected to magnetic force sorting at a feed rate of 0.5 kg/minute, to thereby separate and recover magnetically attractable materials and non-magnetically attractable materials.

Example 2

Magnetically attractable materials and non-magnetically attractable materials were separated and recovered in the same manner as in Example 1, except that unlike in Example 1, whether ignition of the lithium ion secondary batteries inside the cylindrical container had finished or not was judged using a camera installed inside the continuous furnace during the thermal treatment performed at the position of the third wheeled platform counted from the entrance of the furnace, and when it was judged that ignition of the lithium ion secondary batteries had finished, the burning operations of the burners on the exit side (the exit side including the positions of the fifth to eighth wheeled platforms) were stopped, except both burners that were at the position corresponding to the fourth wheeled platform counted from the entrance of the furnace and that were necessary to retain the temperature inside the furnace. That is, in Example 2, the thermal treatment time was shortened from approximately 8 hours of Example 1 to approximately 3 hours.

Moreover, in Example 2, extinction of ignition from the lithium ion secondary batteries was confirmed based on a camera image reflecting the internal view inside the furnace, to thereby judge whether combustion of the lithium ion secondary batteries had finished or not.

Comparative Example 1

Magnetically attractable materials and non-magnetically attractable materials were separated and recovered in the same manner as in Example 1, except that unlike in Example 1, the thermal treatment was performed for 3 hours while the wheeled platforms and the containers were disposed at positions at which the cylindrical containers would be directly contacted by flames radiated from the burners inside the continuous furnace.

<Evaluation>

<<Cylindrical Container Condition after Thermal Treatment>>

The cylindrical container (an example of the target storing unit) after the thermal treatment was evaluated as "C" when the cylindrical container was bored (broken) by a diameter (φ) of 5 mm or greater, "B" when the cylindrical container was deformed by 10 mm or greater, and "A" when the cylindrical container was not bored (broken) and was deformed by less than 10 mm.

<<Recovery Rate and Grade>>

The masses of the fine-grained product, the magnetically attractable materials, and the non-magnetically attractable materials obtained were measured using an electromagnetic balance (product name: GX-8K, obtained from A&D Company, Limited). Subsequently, leaching residues obtained when the magnetically attractable materials and the non-magnetically attractable materials were leached into respective leaching liquids were heated and dissolved in aqua regia (obtained from FUJIFILM Wako Pure Chemical Corporation), and analyzed by an inductively coupled high-frequency plasma emission spectrometer (ICAP6300, obtained from Thermo Fisher Scientific K.K.), to obtain the content percentages (grades) of copper in the fine-grained product, the magnetically attractable materials, and the non-magnetically attractable materials. In addition, the weight percentage (%) of copper recovered in the non-magnetically attractable materials, when the weight of copper contained in all of these products was seen to be 100, was evaluated as the recovery rate of copper.

The condition of the cylindrical container (container condition) after the thermal treatment, and the recovery rate of copper (Cu) and the grade of copper (Cu) in the non-magnetically attractable materials of the coarse-grained product in Example 1, Example 2, and Comparative Example 1 are presented in Table 1.

TABLE 1

| | Container condition | Copper recovery rate (%) | Copper grade (%) |
|---|---|---|---|
| Ex. 1 | B | 85 | 87 |
| Ex. 2 | A | 89 | 89 |
| Comp. Ex. 1 | C | 14 | 63 |

As presented in Table 1, in Examples 1 and 2, deterioration of the cylindrical container was inhibited and the cylindrical container was not broken, the recovery rate of copper into the non-magnetically attractable materials of the coarse-grained product was 80% or higher, and the grade of copper in the non-magnetically attractable materials of the coarse-grained product was also 80% or higher. As can be seen, in Examples 1 and 2, it was possible to inhibit deterioration of the cylindrical container, and to thermally treat the lithium ion secondary batteries efficiently and recover copper, which was an example of the valuable substance, at a high recovery rate at a high grade.

On the other hand, in Comparative Example 1, because the cylindrical container was deteriorated and broken and copper (Cu) current collectors of the lithium ion secondary batteries were oxidized and embrittled, the recovery rate of copper into the coarse-grained product was low, and the recovery rate of copper into the non-magnetically attractable materials was lower than 20% as a result.

As described above, the method for recovering a valuable substance of the present invention includes a thermal treatment step of thermally treating a target containing a valuable substance using a continuous furnace configured to thermally treat the target while moving a target storing unit, in which the target is stored, such that the target storing unit is not contacted by a flame that is for thermal treatment, and a valuable substance recovering step of recovering the valuable substance from a thermally treated product of the target obtained in the thermal treatment step.

Hence, the method for recovering a valuable substance of the present invention can inhibit deterioration of the target storing unit in which the target containing a valuable substance is stored, and can thermally treat the target efficiently and recover the valuable substance at a high recovery rate at a high grade.

REFERENCE SIGNS LIST

11: temperature-raising standby chamber
12: temperature raising section
13: retention section
14: cooling standby chamber
15: actuatable door
16: wheeled platform
17: target storing unit
18: flame
19: secondary combustion furnace
20: flue

The invention claimed is:

1. A method for recovering a valuable substance, the method comprising:

thermally treating a target containing a valuable substance using a continuous furnace configured to thermally treat the target while moving a target storing unit, in which the target is stored, such that the target storing unit is not contacted by a flame that is for thermal treatment; and recovering the valuable substance from a thermally treated product of the target obtained in the thermally treating, wherein the target is a lithium ion secondary battery, wherein the lithium ion secondary battery has a housing containing aluminum, and in the thermally treating, the aluminum of the housing of the lithium ion secondary battery is melted and a melted product is separated.

2. The method for recovering a valuable substance according to claim 1, wherein in the thermally treating, the target storing unit being moved is stopped, and the flame is radiated such that the target storing unit is not contacted by the flame.

3. The method for recovering a valuable substance according to claim 1, wherein when thermally treating a plurality of target storing units, each of which is the target storing unit, in the thermally treating, the flame is radiated from between adjoining ones of the target storing units such that the target storing units are not contacted by the flame.

4. The method for recovering a valuable substance according to claim 1, wherein in the thermally treating, the flame is radiated more weakly while the target storing unit is moved than while the target storing unit is stopped.

5. The method for recovering a valuable substance according to claim 2, wherein in the thermally treating, a ratio of a stop time for which the target storing unit is stopped to a moving time for which the target storing unit is moved satisfies an inequality below, the stop time/the moving time≥10.

6. The method for recovering a valuable substance according to claim 1, wherein the target storing unit is formed of iron or stainless steel.

7. The method for recovering a valuable substance according to claim 1, wherein in the thermally treating, the target is thermally treated at 750° C. or higher and lower than 1,085° C.

8. The method for recovering a valuable substance according to claim 1, wherein the valuable substance contains copper.

9. The method for recovering a valuable substance according to claim 1, wherein in the thermally treating, a combustion state of the lithium ion secondary battery is observed to judge whether combustion of the lithium ion secondary battery has finished or not, and when it is judged that combustion of the lithium ion secondary battery has finished, the thermally treating is terminated.

10. The method for recovering a valuable substance according to claim 1, wherein the recovering the valuable substance includes:

pulverizing the thermally treated product, to obtain a pulverized product;

classifying the pulverized product at a classification point of 0.6 mm or greater and 2.4 mm or less, to obtain a coarse-grained product and a fine-grained product; and sorting the coarse-grained product using a magnet having a magnetic flux density of 0.03 tesla or higher.

* * * * *